(12) United States Patent
Mauri

(10) Patent No.: US 6,406,239 B1
(45) Date of Patent: Jun. 18, 2002

(54) DEVICE FOR FIXING CROSS-PIECES AND THE LIKE TO PAIRS OF UPRIGHTS SUCH AS LEGS OF CHAIRS, TABLES AND THE LIKE

(75) Inventor: Gaetano Mauri, Lecco (IT)

(73) Assignee: F. LLI Mauri S.r.l., Garlate (IT)

( * ) Notice: Subject to any disclaimer, the term of this patent is extended or adjusted under 35 U.S.C. 154(b) by 0 days.

(21) Appl. No.: 09/691,437

(22) Filed: Oct. 18, 2000

(30) Foreign Application Priority Data

Nov. 5, 1999 (IT) .......................................... MI99U0673

(51) Int. Cl.$^7$ ............................ F16B 35/02; F16B 37/12
(52) U.S. Cl. ........................ 411/383; 411/178; 411/389
(58) Field of Search .............................. 411/178, 180, 411/383, 384, 389

(56) References Cited

U.S. PATENT DOCUMENTS

| | | | | |
|---|---|---|---|---|
| 2,312,185 A | * | 2/1943 | Naunherz ............... | 411/389 X |
| 4,223,585 A | * | 9/1980 | Barth et al. ................. | 411/389 |
| 5,343,816 A | * | 9/1994 | Sideris .................... | 411/383 X |
| 5,601,339 A | * | 2/1997 | Buiani .................... | 411/389 X |
| 5,613,968 A | * | 3/1997 | Lin ........................ | 411/389 X |

* cited by examiner

Primary Examiner—Neill Wilson
(74) Attorney, Agent, or Firm—Ladas & Parry

(57) ABSTRACT

Device for rapidly fixing cross-pieces to pairs of uprights, in particular pairs of legs of chairs, tables and the like, in which the cross-piece have inserted within a pair of cylindrical elements which each have a first thread in opposite directions to each other for insertion, axially, into the opposite ends of the cross-piece and a second thread in the same direction as the respective first thread for insertion into a corresponding seat of the uprights, the rotation of the cross-piece in the same direction causing the simultaneous pulling of the two opposite uprights until they come into stable contact against the opposite ends of the cross-piece.

6 Claims, 1 Drawing Sheet

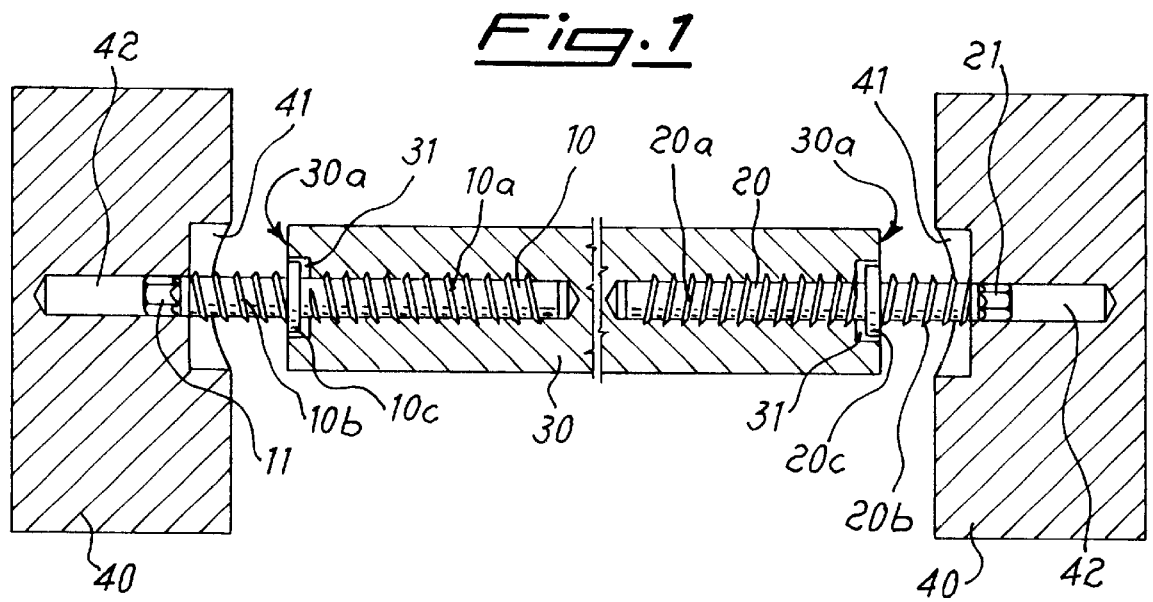
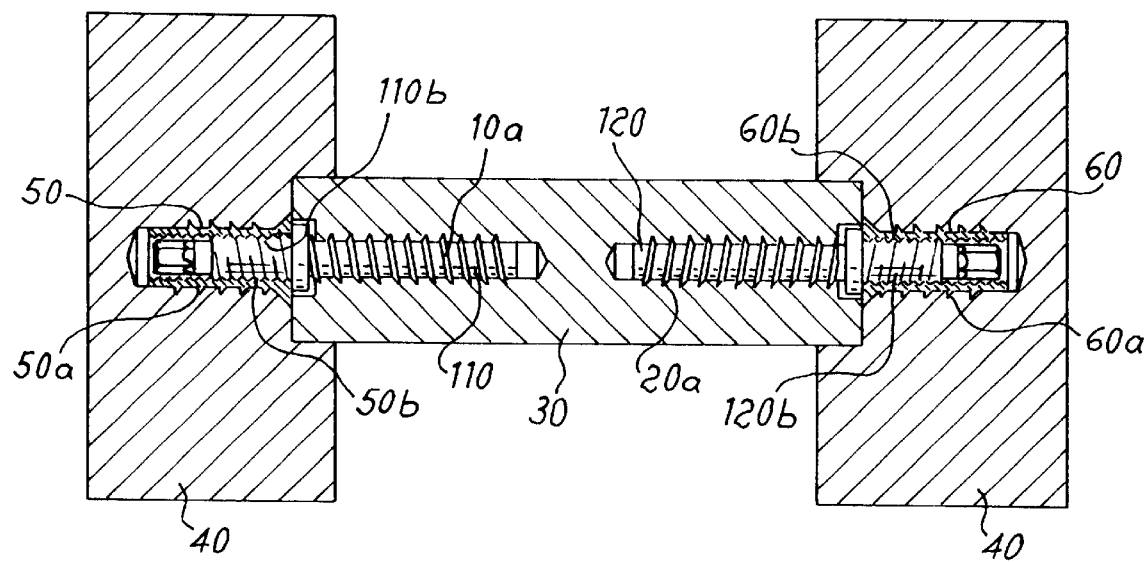
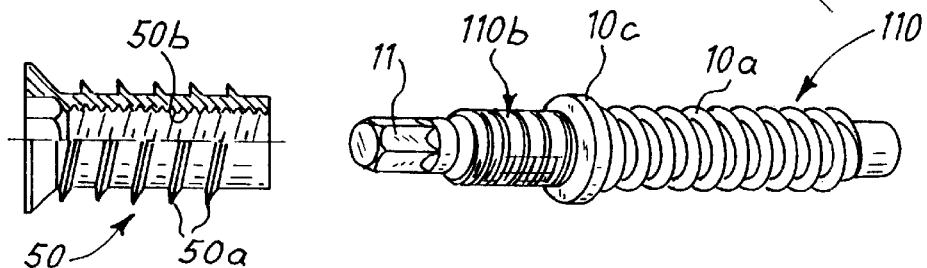

DEVICE FOR FIXING CROSS-PIECES AND THE LIKE TO PAIRS OF UPRIGHTS SUCH AS LEGS OF CHAIRS, TABLES AND THE LIKE

DESCRIPTION

1. Background of the Invention

The present invention relates to a device for fixing, by means of elements exerting a pulling force, cross-pieces and/or cross members to pairs of vertical members and uprights in general, in particular to pairs of legs of chairs, small tables and the like.

2. Field of the Invention

In the art it is known that the fixing of cross-pieces to pairs of uprights forming the four legs of a chair, normally made of wood, is performed by forming, in the said legs, a seat—generally a circular hole or a quadrangular or polygonal recess—into which one end of the cross-piece is inserted, said end being suitably shaped so as to be correctly positioned inside the seat formed in the leg. Fixing of the ends of the cross-pieces inside said seats is performed, in certain cases, by means of engagement with slight forcing and, in other cases, by means of gluing.

It is also known that the systems which perform securing with glues or by means of simple engagement are, however, unable to ensure over time, in the case of prolonged use of the chair and owing to possible "shrinkage" of the wood, secure and permanent stability of the joint between legs and cross-pieces, so that the only solution to this problem is to perform disassembly of the chair and repair of the fitted or glued joint, even when only one cross-piece is loose.

Basically the present-day systems for securing cross-pieces to legs of chairs and tables in general do not allow rapid assembly and restoration of the stable joint between legs and cross-pieces, without having to perform time-consuming disassembly and subsequent reassembly operations which nevertheless result in alteration in the dimensions of the joint.

SUMMARY OF THE INVENTION

The technical problem which is posed, therefore, is that of providing a device for rapidly fixing cross-pieces to the legs of chairs, tables and similar structures, which is designed to overcome the drawbacks of the present fixing systems both of the type involving simple engagement and of the type using glues or other fixing means.

Within the scope of this problem a further requirement is to provide a device for fixing cross-pieces to uprights or vertical members of chairs, tables and the like, which is structured so as to allow both assembly and adjustment of the stability of the fixing joint of each individual cross-piece independently of the other cross-pieces and without the use of special tools.

A further object is to provide a fixing device of the type mentioned above, suitable for securing cross-pieces made of the various materials, such as wood, metal, rigid plastic or the like, to uprights or vertical members made of a material also different from that of the cross-pieces.

This technical problem is solved according to the present invention by a device for rapidly fixing cross-pieces to pairs of uprights, in particular pairs of legs of chairs, tables and the like, in which the cross-pieces have inserted within a pair of cylindrical elements which each have a first thread in opposite directions to each other for insertion, axially, into the opposite ends of said cross-piece and a second thread in the same direction as the respective first thread for insertion into a corresponding seat of said uprights, the rotation of the cross-piece in the same direction causing the simultaneous pulling of the two opposite uprights until they come into stable contact against the opposite ends of said cross-piece.

Further characteristic features and advantages of the present invention will emerge from the following detailed description provided with reference to the accompanying plate of drawings.

BRIEF DESCRIPTION OF DRAWING FIGURES

FIG. 1 shows a cross-sectional view of the fixing device according to the invention in the condition ready for assembly on two opposite uprights;

FIG. 2 shows a cross-sectional view of a further embodiment of the device according to the invention, shown in the position where a cross-piece is stably fixed to the two opposite uprights, and FIG. 3 shows a partially sectioned perspective view of the two metal components forming the fixing device according to FIG. 2.

DETAILED DESCRIPTION OF THE INVENTION

With reference to the abovementioned figures and in particular to FIG. 1, the fixing device of the tie-rod type provided in accordance with the invention essentially consists of a pair of cylindrical bars 10 and 20 which are provided with a first external thread 10a and 20a, in opposite directions to each other, and a second thread 10b, 20b respectively in the same direction as the associated first thread 10a, 20a of each bar.

The length of said first threads 10a, 20a is such that the latter may be coaxially screwed into the opposite ends 30a of a cross-piece 30 arranged so as to be secured to two opposite uprights such as, for example, two legs 40 of a chair (not shown). The second thread 10b, 20b forms the element for fixing the cross-piece 30 to the opposite uprights 40 onto which it is fixed by means of screwing into a corresponding hole 42 formed, also coaxially, in the said uprights.

Said hole 42 is in turn formed on the bottom of an inset seat 41 able to contain, in the longitudinal direction, the end 30a of the cross-piece so as to favour the stable engagement, at right angles, between the two parts.

Each threaded bar 10,20 is also provided with an annular projection 10c,20c designed to form a stop shoulder for screwing of the bar 10, 20 into the cross-piece 30, said screwing being facilitated by the hexagonal shape 11,21 of the free end of the second thread 10b,20b.

The operating principle of the device is as follows: the two threaded bars 10,20 are screwed into the opposite ends of the cross-piece 30, if necessary acting on the hexagonal end 11,21, until the annular projection 10c,20c comes into contact against the bottom of the respective seat 31, and then the opposite ends 11,21 are inserted into the respective seats 42 of the uprights 40, acting directly on the cross-piece 30 so as to rotate it, for example, in a clockwise direction and thus cause simultaneous engagement of the two second threads 10b,20b into the respective holes 42.

Since said second threads lie in opposite directions, the single rotating action exerted on the cross-piece 30 causes simultaneous screwing of the opposite threads into the uprights and consequent pulling together of the latter until the ends of the cross-piece 30 come into contact against the bottom of the respective seat 41 in the upright 40, resulting in a stable right-angled joint between the parts.

In the example according to FIG. 1, the device envisages second threads of the self-tapping type for direct engagement with the upright 40, although it is envisaged that the device may be constructed in accordance with an alternative embodiment illustrated in FIGS. 2 and 3.

This embodiment envisages screwing, into the associated seats 42 of the uprights 40, a respective bush 50,60 (FIG. 3) respectively provided with a thread 50*a*,60*a* in the same direction for screwing into the respective upright 40 and a female thread 50*b*,60*b* in the opposite direction.

Correspondingly, the second thread 110*b*, 120*b* will be of the type corresponding to the said female thread 50*b*,60*b* so as to allow mutual engagement.

In this configuration the bush 50,60 is screwed into the corresponding seat 42 in the upright 40 and becomes the stable element for joining with the cross-piece, allowing an engagement between the screw 110*b*,120*b* and female thread 50*b*,60*b* of the metal-to-metal type which prevents damage to the seat 41 following the need for any repeated tightening operations in order to restore the stability of the joint between cross-piece and upright.

Basically it has been found that, with the tie-rod device described further above, it is possible to perform, in addition to stable fixing without the use of special means, also adjustment of the fixed joint rapidly and for each cross-piece, whenever the need arises.

The same advantages are obtained also in the case where it should be required to disassemble all the legs and then re-assemble them, without the need for any other fixing means.

Finally modifications may be made, during practical realization, to the dimensions of the component parts and the materials used in the invention as described above with regard to a few embodiments thereof, without departing from the scope of protection of the said invention.

What is claimed is:

1. Device for rapidly fixing cross-pieces to pairs of uprights, in particular pairs of legs of chairs, tables and the like, wherein said cross-pieces have inserted within a pair of cylindrical elements which each have a first thread in opposite directions to each other for insertion, axially, into the opposite ends of said cross-piece and a second thread in the same direction as the respective first thread for insertion into a corresponding seat of said uprights, the rotation of the cross-piece in the same direction causing the simultaneous pulling of the two opposite uprights until they come into stable contact against the opposite ends of said cross-piece.

2. Fixing device according to claim 1, wherein said first thread of the cylindrical elements is of the self-tapping type.

3. Fixing device according to claim 1, wherein said cylindrical element has an annular end-of-travel projection.

4. Fixing device according to claim 1, further comprising a pair of bushes provided with a thread in the same direction for screwing into said uprights and a female thread in the opposite direction for joining with said second thread of the respective cylindrical element associated with the cross-piece.

5. Fixing device according to claim 4, wherein said second thread of the cylindrical element is of the type comprising a decimal metric thread.

6. Fixing device according to claim 1, wherein the free end of said second thread of the cylindrical element has a hexagonal cross-section or the like for operation using a tool.

* * * * *